3,375,096
METHOD OF CONTROLLING PLANT GROWTH
Theodore A. Girard, Wayne, N.J., assignor to Tenneco Chemicals, Inc., a corporation of Delaware
No Drawing. Filed June 2, 1964, Ser. No. 372,073
6 Claims. (Cl. 71—122)

This invention relates to novel herbicidal compositions and to methods of controlling or inhibiting plant growth.

In accordance with the present invention, it has been found that chlorophenyl trichloromethyl carbinols have unusual and valuable properties as selective herbicides. These carbinols may be applied to a wide variety of plant species to control or inhibit their growth. They may be applied to an area containing a crop to inhibit the growth of broad-leafed weeds and annual weeds therein, or they may be used to destroy all of the plants in an area. While they may be applied to soil or to another medium normally supporting plant growth to prevent the germination of seeds therein, they are of particular value when used as selective post-emergence herbicides.

The chlorophenyltrichloromethyl carbinols that have proven to be valuable as selective herbicides may be represented by the structure

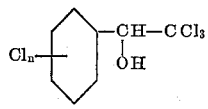

wherein $n$ is a number in the range of 1 to 5. Particularly effective as herbicides are those carbinols having chlorine atoms in one and preferably in both of the ring positions adjacent to the side chain. These include, for example, o - chlorophenyltrichloromethyl carbinol, 2,4 - dichlorophenyltrichloromethyl carbinol, 2,6 - dichlorophenyltrichloromethyl carbinol, 2,3,5 - trichlorophenyltrichloromethyl carbinol, 2,4,5 - trichlorophenyltrichloromethyl carbinol, 2,3,6 - trichlorophenyltrichloromethyl carbinol, 2,3,5,6 - tetrachlorophenyltrichloromethyl carbinol, and 2,3,4,5,6 - pentachlorophenyltrichloromethyl carbinol. 2,6 - dichlorophenyltrichloromethyl carbinol and 2,3,6 - trichlorophenyltrichloromethyl carbinol are exceptionally valuable as post-emergence selective herbicides because they can be used to control the growth of such weeds as crabgrass and bindweed while causing little or no damage to desirable grasses or crops in the treated area. Also included within the scope of this invention are esters of the carbinols, for example those derived from alkanoic acids having from 1 to 6 carbon atoms, benzoic acid, chlorobenzoic acids, hydroxybenzoic acids, and the like, it being evident that such esters are capable of hydrolyzing to the parent carbinols. Also included are mixtures containing two or more of the aforementioned carbinols or esters thereof.

The carbinols may be prepared by any convenient procedure. They may be prepared, for example, by the reaction of the appropriate chlorobenzaldehyde with chloroform in the presence of potassium hydroxide or by reaction of a chlorobenzene with chloral in the presence of an aluminum chloride catalyst.

The carbinols may, if desired, be applied as such to the locus to be treated. Ordinarily and preferably, however, these compounds are used in combination with an inert diluent or carrier to make it easier to measure accurately and to apply evenly the small amounts of the herbicide that are required to control plant growth as well as to apply them in a form that will be readily dispersed through the soil and/or absorbed by the plants. These compounds can be mixed with or deposited upon inert particulate solids, such as fullers earth, talc, diatomaceous earth, natural clay, kaolin, walnut shell flour, and the like, to form dry particulate compositions. Such compositions may be employed as dusts, or they may, if desired, be dispersed in water with or without the aid of a surface-active agent. Alternatively, the dry compositions may be formed into granules or pellets by known techniques.

The carbinols are preferably dispensed in the form of solutions or dispersions in inert organic solvents or in mixtures of inert organic solvents and water. The solvents that may be used in the preparation of these compositions include both polar and non-polar aliphatic and aromatic solvents including, for example, benzene, toluene, xylene, naphtha, nitrobenzene, dimethylformamide, carbon tetrachloride, acetone, methyl ethyl ketone, ethanol, propanol, butanol, dioxane, and mixtures thereof.

The concentration of the carbinol in the compositions may vary widely and depends upon a number of factors, among the most important of which are the amount of the composition to be applied per unit of area and the type or types of plants being treated. In most cases the herbicidal compositions are applied in the form of sprays, dusts, or granules that contain from about 0.1% to 80% by weight of the active component. If desired, other herbicidal compounds may also be present in the compositions.

The invention is further illustrated by the examples that follow. It is to be understood, however, that these examples are not to be construed as being limitative, but are furnished merely for the purpose of illustration.

Example 1

To a reaction mixture containing 3370 grams of chloroform and 525 grams of trichlorobenzaldehyde (85% 2,3,6-isomer) at 5°–10° C. was added a solution of 84 grams of potassium hydroxide and 55 grams of sodium hydroxide in 625 grams of 2-(2-methoxyethoxy) ethanol over a period of 2 hours. The mixture was then stirred for 3 days at room temperature. After the addition of 500 ml. of hydrochloride acid, the crude product was separated and washed with 1 liter of water, with two 1 liter portions of sodium bisulfite, and with 1 liter of water. The unreacted chloroform was removed and the crude product was distilled under vacuum. There was obtained 380 grams of a waxy solid that boiled at 150° C./0.35 mm. and that contained 62.7 percent of chlorine (calculated for 2,3,6-trichlorophenyltrichloromethyl carbinol, 64.8 percent chlorine).

Example 2

Using the procedure described in Example 1, 2,6-dichlorobenzaldehyde was reacted with chloroform. There was obtained 360 grams of a viscous liquid that boiled at 130°–140° C./0.25 mm. and that contained 57.4 percent of chlorine (calculated for 2,6-dichlorophenyltrichloromethyl carbinol, 60.4 percent chlorine).

Example 3

Groups of greenhouse flats containing a mixture of sand and silt loam were planted with seeds of various representative plant species. Three weeks after planting the plants were sprayed with an emulsion containing 0.3 percent by weight of a chlorophenyltrichloromethyl carbinol. The amount of the suspension used in each case was such as to apply the carbinol at the rate indicated in Table I. The results were observed 14 days after the application of the herbicidal composition.

In Table I the effectiveness of the herbicidal compounds, as determined by comparison with untreated plantings, is indicated by the numbers "0" through "10"

in increasing order of effectiveness. Thus "0" indicates no herbicidal activity; "1"–"3," slight injury; "4"–"6," moderate injury; "7"–"9," severe injury; and "10," destruction of all plants.

TABLE I

| Plant Species | Herbicide | | |
|---|---|---|---|
| | 2,6-dichlorophenyltrichloromethyl carbinol | 2,3,6-trichlorophenyltrichloromethyl carbinol | |
| | 10#/acre | 10#/acre | 5#/acre |
| Corn | 5 | 5 | 5 |
| Wheat | 3 | 8 | 8 |
| Oats | 3 | 5 | 3 |
| Soybeans | 2 | 10 | 10 |
| Clover | 8 | 10 | 10 |
| Onions | 0 | 10 | 10 |
| Foxtail | 8 | 10 | 10 |
| Ryegrass | 0 | 2 | 0 |
| Crabgrass | 10 | 10 | 10 |
| Mustard | 10 | 10 | 10 |
| Buckwheat | 10 | 10 | 10 |
| Morning Glory | 10 | 10 | 10 |

*Example 4*

Groups of greenhouse flats containing soil were planted with seeds of various crop plants and weeds. To insure uniform growth, all of the seeds were pregerminated before planting. Just after planting a 0.5 percent aqueous suspension of o- or p-chlorophenyltrichloromethyl carbinol was applied evenly to the surface of the soil. The effectiveness of this treatment was determined by comparing the plants in the treated flats with untreated plants. The results of the tests are given in Table II.

TABLE II

Herbicide: Herbicidal activity
  o-Chlorophenyltrichloromethyl carbinol _____ 8
  p-Chlorophenyltrichloromethyl carbinol _____ 6

What is claimed is:
1. The method for the control of plant growth which comprises applying to the locus to be treated a phytotoxic amount of a compound having the structure

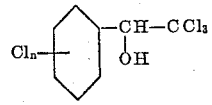

wherein $n$ represents a number in the range of 1 to 5.

2. The method for the control of plant growth which comprises applying to the locus to be treated a phytotoxic amount of 2,6-dichlorophenyltrichloromethyl carbinol.

3. The method for the control of plant growth which comprises applying to the locus to be treated a phytotoxic amount of 2,3,6-trichlorophenyltrichloromethyl carbinol.

4. The method of controlling plant growth which comprises applying to the plants a phytotoxic amount of a compound having the structure

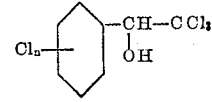

wherein $n$ represents a number in the range of 1 to 5.

5. The method of controlling plant growth which comprises applying to the plants a phytotoxic amount of 2,6-dichlorophenyltrichloromethyl carbinol.

6. The method of controlling plant growth which comprises applying to the plants a phytotoxic amount of 2,3,6-trichlorophenyltrichloromethyl carbinol.

References Cited

UNITED STATES PATENTS 2,926,078   2/1960   Josephs _____ 71—2.3
3,151,018   9/1964   Girard _____ 167—30

FOREIGN PATENTS 138,114   9/1961   Russia.

JAMES O. THOMAS, Jr., *Primary Examiner.*

LEWIS GOTTS, *Examiner.*